(12) United States Patent
Yamaguchi et al.

(10) Patent No.: US 6,576,683 B2
(45) Date of Patent: Jun. 10, 2003

(54) AROMATIC POLYIMIDE FOAM

(75) Inventors: Hiroaki Yamaguchi, Tokyo (JP); Shigeru Yamamoto, Chiba (JP)

(73) Assignee: Ube Industries, Ltd., Yamaguchi (JP)

( * ) Notice: Subject to any disclaimer, the term of this patent is extended or adjusted under 35 U.S.C. 154(b) by 0 days.

(21) Appl. No.: 09/895,513

(22) Filed: Jun. 28, 2001

(65) Prior Publication Data

US 2002/0040068 A1 Apr. 4, 2002

(30) Foreign Application Priority Data

Jun. 28, 2000 (JP) ........................................ 2000-193658

(51) Int. Cl.$^7$ .................................................. C08J 9/00
(52) U.S. Cl. ........................ 521/154; 521/183; 521/184; 521/185; 521/189
(58) Field of Search ................................. 521/183, 184, 521/185, 189, 154

(56) References Cited

U.S. PATENT DOCUMENTS 4,808,686 A * 2/1989 Cella et al.
5,122,546 A * 6/1992 Lee

* cited by examiner

Primary Examiner—Morton Foelak
(74) Attorney, Agent, or Firm—Reed Smith LLP

(57) ABSTRACT

A flexible polyimide foam having an apparent density of 70 kg/m$^3$ or less and a glass transition temperature of 300° C. or higher can be prepared by mixing an aromatic tetracarboxylic acid comprising 2,3,3',4'-biphenyltetracarboxylic dianhydride a portion of which is converted into its mono- or di-lower primary alcohol ester with an aromatic polyamine containing diaminodisiloxane in an amount of 0.1 to 10 mol. %, based on the amount of total amine compounds, to give a solid of polyimide precursor; and heating the solid of polyimide precursor to a temperature of 300° C. to 500° C.

14 Claims, 2 Drawing Sheets

AROMATIC POLYIMIDE FOAM

CROSS-REFERENCES TO RELATED APPLICATIONS

This application claims priority of Japanese Application No. 2000-193658 filed Jun. 28, 2000, the complete disclosure of which is hereby incorporated by reference.

FIELD OF THE INVENTION

This invention relates to a flexible aromatic polyimide foam having a high glass transition temperature.

BACKGROUND OF THE INVENTION

Foamed products such as polystyrene foam and polyoelfin foam are well known. These foamed products are rigid and have low heat resistance.

Polyurethane foam is also well known as a flexible foam but also has low heat resistance.

U.S. Pat. No. 4,241,193 discloses dense, rigid polyimide foam which is derived from mixtures of aromatic diamines and partial esters of a benzophenonetetracarboxylic acid.

European Patent Specification (EP) 0 437 821 B1 describes a method for producing polyimide products from a combination of an alkyl ester of a tetracarboxylic acid with at least one aromatic and/or heterocyclic aromatic primary diamine.

A polyimide foam product (tradename: SOLIMIDE) is commercially available from INSPEC Corp. This polyimide foam has a glass transition temperature of approx. 250° C.

SUMMARY OF THE INVENTION

It is an object of the invention to provide a flexible polyimide foam having a high glass transition temperature.

The invention resides in a flexible aromatic polyimide foam having an apparent density of 70 kg/m$^3$ or less and a glass transition temperature of 300° C. or higher.

The flexible aromatic polyimide foam of the invention can be prepared by a process comprising the steps of:

mixing an aromatic tetracarboxylic acid comprising 2,3,3',4'-biphenyltetracarboxylic dianhydride a portion of which is converted into a mono- or di-lower primary alcohol ester thereof with an aromatic polyamine containing diaminodisiloxane in an amount of 0.1 to 10 mol. %, based on the amount of total amine compounds, to give a solid of polyimide precursor; and heating the solid of polyimide precursor to a temperature of 300° C. to 500° C.

DETAILED DESCRIPTION OF THE INVENTION

Figure 1:
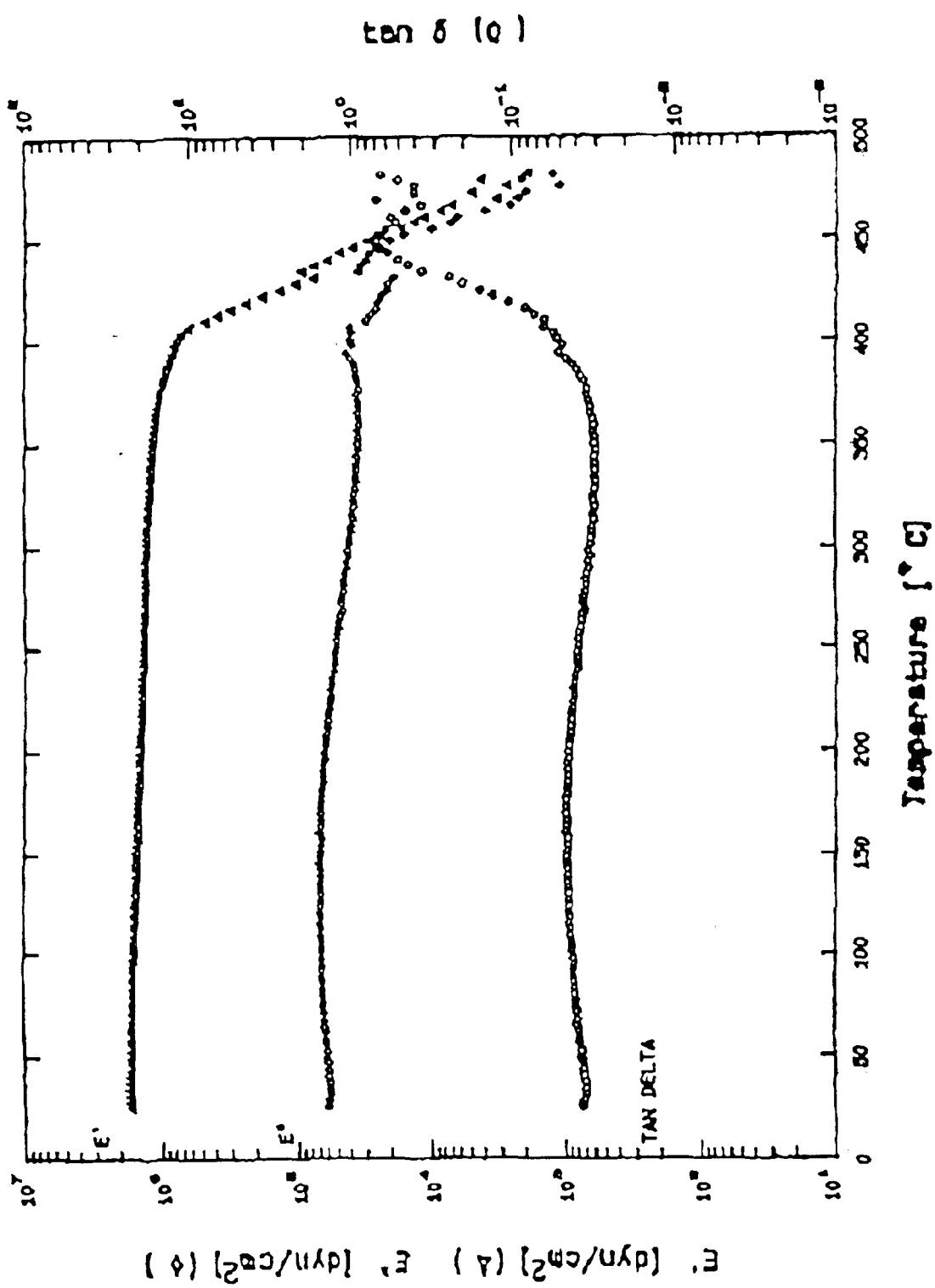
FIG. 1 is a viscoelasticity chart of a polyimide foam produced in Example 2.

The invention is further described by the following examples.

The flexible aromatic polyimide foam of the invention has an apparent density of 70 kg/m$^3$ or less (preferably in the range of 5 to 30 kg/m$^3$) and a glass transition temperature of 300° C. or higher (preferably 350° C. or higher). The apparent density of 70 kg/m$^3$ or less of the flexible polyimide foam essentially corresponds to an extent of foaming of 20 times or more.

The flexible aromatic polyimide foam of the invention can be prepared by a process comprising the following two steps.

The first step is directed to produce a solid of polyimide precursor, and can be performed by mixing an aromatic tetracarboxylic acid comprising 2,3,3',4'-biphenyltetracarboxylic dianhydride (hereinafter referred to a-BPDA) a portion (preferably 25 to 50 mol %) of which is converted into a mono- or di-lower primary alcohol ester thereof with an aromatic polyamine (e.g., p-phenylene diamine, or 4,4'-diaminodiphenyl ether) containing diaminodisiloxane in an amount of 0.1 to 10 mol. %, based on the amount of total amine compounds, to give a solid of polyimide precursor.

In the first step, an amine compound having three or more amino groups, such as an aromatic triamine compound or an aromatic tetramine compound can be added to the mixture. An esterifying solvent such as a primary lower alcohol (e.g., methanol, ethanol, n-propanol, or n-butanol) can be employed for dissolving the mixture in the solvent. A mixture of methanol and ethanol is preferably employed. In the prepared solution, the content of non-volatile components preferably is in the range of 10 wt. % to 50 wt. %. The mixture may further contain an imidizing catalyst such as 1,2-dimethylimidazole, benzimidazole, isoquinoline or a substituted pyridine. The mixture may also contain other additives such as an inorganic filler and an inorganic or organic pigment.

The mixture in the form of a solution is then converted into a powdery solid mixture by heating the solution utilizing a known apparatus such as a spray dryer or an evaporator. The solution is generally heated to a temperature lower than 100° C., preferably 80° C. or lower. The drying procedure can be carried out at atmospheric pressure or at an increased or decreased pressure.

The dried mixture was then subjected to the second step for producing the desired flexible aromatic polyimide foam.

The second step can be performed by heating the powdery solid of polyimide precursor produced in the first step to a temperature of 300° C. to 500° C. The second step can preferably be conducted by two stages: the first stage for foaming the solid of polyimide precursor to give a rigid foam and the second stage for annealing the rigid foam to give a flexible foamed product.

The first stage is preferably carried out by heating the powdery solid by means of a microwave generator. Accordingly, in the first stage, the powdery solid or a dispersion of the powder solid in an appropriate solvent is placed on a plate or in an vessel. The plate or vessel should be resistant to microwaves.

The heating by means of microwaves can be carried out, for instance, at a power of 2.45 GHz. The power of microwave is appropriately chosen in consideration of the powdery solid to be heated. For instance, the powdery solid is heated under the condition of approx. 100 g/1 kW for starting the foaming at approx. one minute, and then the foaming is complete at 2 or 3 minutes. The foamed product is rigid and brittle.

The rigid and brittle foam is then annealed to give the desired flexible foam. For this purpose, the rigid foam can be gradually heated starting from approx. 200° C., preferably at a temperature elevation rate of approx. 100° C./10 min., up to a temperature corresponding to the glass transition temperature of the foam or higher (that is, Tg or higher), for a period of 5 to 60 minutes, preferably for 10 minutes.

Thus produced flexible foam can be cut, if desired, to give a product of the desired dimensions, in consideration of the utilization of the flexible foam.

In the preparation of the flexible aromatic polyimide foam of the invention, the 2,3,3',4'-biphenyltetracarboxylic dianhydride (a-BPDA) can be employed in combination with a relatively small amount (less than 50 mol. %) of other aromatic tetracarboxylic anhydrides or their reactive derivatives. Examples of the other aromatic tetracarboxylic anhydrides include 3,3',4,4'-biphenyltetracarboxylic acid dianhydride (hereinafter referred to as s-BPDA), pyromellitic dianhydride (hereinafter referred to as PMDA), 3,3',4,4'-benzophenonetetracarboxylic dianhydride (hereinafter referred to as BTDA), bis(3,4-dicarboxyphenyl)ether dianhydride, 2,3,6,7-naphthalenetetracarboxylic dianhydride, 1,2,5,6-naphthalenetetracarboxylic dianhydride, 1,2,4,5-naphthalenetetracarboxylic dianhydride, 1,4,5,8-naphthalenetetracarboxylic dianhydride, 2,2-bis(2,5-dicarboxyphenyl)propane dianhydride, 1,1-bis(2,3-dicarboxyphenyl)ethane dianhydride, 1,1-bis(3,4-dicarboxyphenyl)ethane, and 1,3-bis(3,4-dicarboxyphenyl)-1,1,3,3-tetradimethyldisiloxane dianhydride.

The diamine preferably has two nuclei, particularly two benzene rings. Diamine having three or four nuclei may be employed in combination with the diamine to make the preparation of the desired flexible foam easy and smooth.

The diaminodisiloxane can serve as surfactant to give a uniform polyimide foam structure and is preferably employed in an amount of 0.1 to 10 mol. %, more preferably 0.2 to 5 mol. %, based on the amount of total amine compounds.

The present invention is further described by the following examples.

EXAMPLE 1

In a 500 mL-volume egg-plant type flask were placed 58.8 g (200 mmol.) of 2,3,3',4'-biphenyltetracarboxylic dianhydride (a-BPDA), 75 g of ethanol, and 2.4 g of 1,2-dimethylimidazole (DMZ, catalyst). The mixture in the flask was refluxed under stirring for 60 minutes by placing the flask on an oil bath heated to 100° C., to give a homogeneous reaction mixture.

The reaction mixture was cooled to 60° C., and 21.4 g (198 mmol.) of p-phenylenediamine (PPD), 0.5 g (2 mmol.) of 1,3-bis(3-aminopropyl)tetramethyldisiloxane (DADSi), and 77.1 g of ethanol were added. The mixture was stirred to give a homogeneous solution.

The solution was concentrated in an evaporator and further heated at 60° C. to dryness in a vacuum dryer. The dry product was pulverized to give a powdery product in a mortar.

The powdery product was placed in a compression molding press (S-37.5, available from Jinto Metal Works, Co., Ltd.) using a spacer of 5 mm and subjected to compression molding at room temperature.

The compressed mold was placed in an electric oven (RE-4100, available from Sharp Co., Ltd.) and heated by microwaves at 1,100 W for 3 minutes. Thus heated mold was subsequently placed in a heating oven heated to 180° C. for 5 minutes. The temperature of the oven was gradually increased to 330° C. for 30 minutes, and then the temperature was kept at the same temperature for 10 minutes. The mold was then placed in an electric furnace (FM 48, available from Yamato Science Co., Ltd.) heated to 300° C. for 5 minutes. The temperature of the electric furnace was increased to 450° C. for 15 minutes, and the same temperature was kept for 10 minutes.

The resulting foamed product was flexible and had a foaming extent (ratio) of 142 times, an apparent density of 9.5 kg/m$^3$, and a glass transition temperature (Tg) of 390° C.

The foamed product had a satisfactorily high physical strength and was smoothly cut. In comparison with the commercially available polyimide foam (SOLIMIDE), the foamed product of Example 1 had a higher glass transition temperature and a higher extension strength (as much as ten times), and easily recovered its original form.

EXAMPLE 2

In a 500 mL-volume egg-plant type flask were placed 58.8 g (200 mmol.) of a-BPDA, 75 g of methanol, and 2.4 g of DMZ. The mixture in the flask was refluxed under stirring for 60 minutes by placing the flask on an oil bath heated to 90° C., to give a homogeneous reaction mixture.

The reaction mixture was cooled to 60° C., and 21.4 g (198 mmol.) of PPD, 0.5 g (2 mmol.) of DADSi, and 77.1 g of methanol were added. The mixture was stirred to give a homogeneous solution.

The resulting solution was further processed in the same manner as in Example 2, to give a flexible foamed product having a foaming extent (ratio) of 102 times, an apparent density of 13.2 kg/m$^3$, and a glass transition temperature (Tg) of 400° C.

A viscoelasticity chart of the produced flexible foam is shown in FIG. 1 of the attached drawings.

The foamed product had a satisfactorily high physical strength and was smoothly cut. In comparison with the commercially available polyimide foam (SOLIMIDE), the foamed product of Example 2 had a higher glass transition temperature and a higher extension strength (as much as ten times), and easily recovered its original form.

EXAMPLE 3

In a 500 mL-volume egg-plant type flask were placed 29.4 g (100 mmol.) of a-BPDA, 60 g of methanol, and 1.4 g of DMZ. The mixture in the flask was refluxed under stirring for 60 minutes by placing the flask on an oil bath heated to 90° C., to give a homogeneous reaction mixture.

The reaction mixture was cooled to 60° C., and 11.6 g (58 mmol.) of 4,4'-diaminodiphenyl ether (ODA), 4.3 g (10 mmol) of 3,3',4,4'-tetraaminobiphenyl (TAB), 0.5 g (2 mmol.) of DADSi, and 200.0 g of methanol were added. The mixture was stirred to give a homogeneous solution.

The resulting solution was further processed in the same manner as in Example 3, to give a flexible foamed product having a foaming extent (ratio) of 147 times, an apparent density of 9.2 kg/m$^3$, and a glass transition temperature (Tg) of 372° C.

Figure 2:
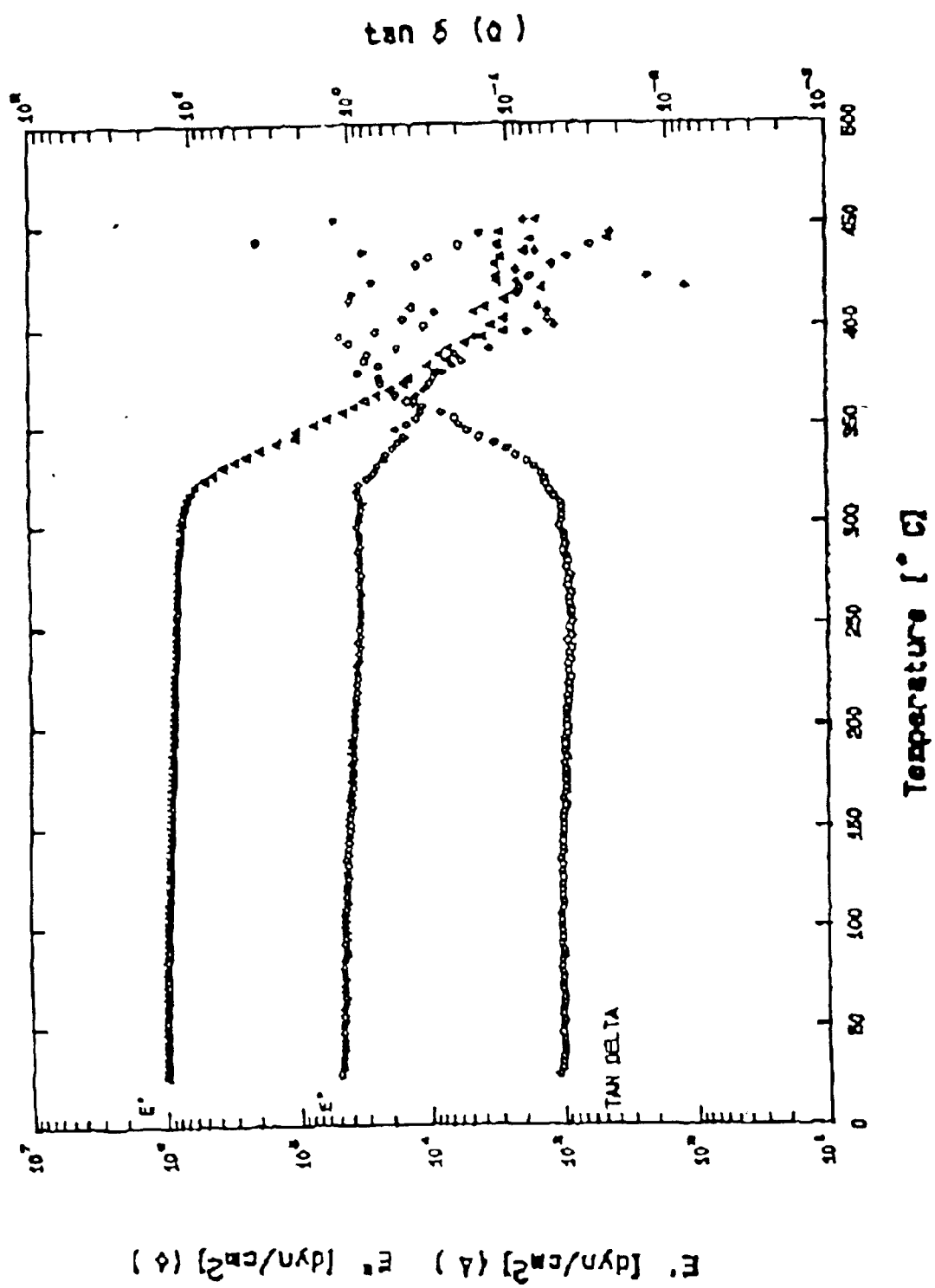
FIG. 2 is a viscoelasticity chart of a polyimide foam produced in Example 3.

A viscoelasticity chart of the produced flexible foam is shown in FIG. 2 of the attached drawings. The foamed product had a satisfactorily high physical strength and was smoothly cut. In comparison with the commercially available polyimide foam (SOLIMIDE), the foamed product of Example 3 had a higher glass transition temperature and a higher extension strength (as much as ten times), and easily recovered its original form.

EXAMPLE 4

In a 500 mL-volume egg-plant type flask were placed 47.1 g (160 mmol.) of a-BPDA, 12.9 g (40 mmol.) of 3,3',4,4'- benzophenonetetracarboxylic dianhydride (BTDA), 75 g of methanol, and 2.5 g of DMZ. The mixture in the flask was refluxed under stirring for 60 minutes by placing the flask on an oil bath heated to 90° C., to give a homogeneous reaction mixture.

The reaction mixture was cooled to 60° C., and 21.4 g (198 mmol.) of PPD, 0.5 g (2 mmol.) of DADSi, and 77.1 g of methanol were added. The mixture was stirred to give a homogeneous solution.

The resulting solution was further processed in the same manner as in Example 1, to give a flexible foamed product having a foaming extent (ratio) of 64 times, an apparent density of 21.2 kg/m$^3$, and a glass transition temperature (Tg) of 373° C.

The foamed product had a satisfactorily high physical strength and was smoothly cut. In comparison with the commercially available polyimide foam (SOLIMIDE), the foamed product of Example 4 had a higher glass transition temperature and a higher extension strength (as much as ten times), and easily recovered its original form.

COMPARISON EXAMPLE 1

In a 500 mL-volume egg-plant type flask were placed 29.4 g (100 mmol.) of a-BPDA, 75 g of methanol, and 1.5 g of DMZ. The mixture in the flask was refluxed under stirring for 60 minutes by placing the flask on an oil bath heated to 90° C., to give a homogeneous reaction mixture.

The reaction mixture was cooled to 60° C., and 10.8 g (110 mmol.) of PPD and 77.1 g of methanol were added. The mixture was stirred to give a homogeneous solution.

The resulting solution was further processed in the same manner as in Example 1, to give a rigid foamed product having a foaming extent (ratio) of 50 times, an apparent density of 26.8 kg/m$^3$, and a glass transition temperature (Tg) of 405° C.

What is claimed is:

1. A flexible polyimide foam having an apparent density of 70 kg/m$^3$ or less and a glass transition temperature of 300° C. or higher.

2. The flexible polyimide foam of claim 1, wherein the apparent density is in the range of 5 to 30 kg/m$^3$.

3. The flexible polyimide foam of claim 1, wherein the glass transition temperature is 350° C. or higher.

4. The flexible polyimide foam of claim 1, wherein the polyimide comprises 2,3,3',4'-biphenyltetracarboxylic acid units, aromatic diamine units, and diaminosiloxane units.

5. The flexible polyimide foam of claim 1, wherein the polyimide comprises 2,3,3',4'-biphenyltetracarboxylic acid units, aromatic diamine units, aromatic tetraamine units, and diaminosiloxane units.

6. A process for producing a flexible polyimide foam of claim 1, which comprises the steps of:
   mixing an aromatic tetracarboxylic acid comprising 2,3,3',4'-biphenyltetracarboxylic dianhydride a portion of which is converted into a mono- or di-lower primary alcohol ester thereof with an aromatic polyamine containing diaminodisiloxane in an amount of 0.1 to 10 mol. %, based on the amount of total amine compounds, to give a solid of polyimide precursor; and
   heating the solid of polyimide precursor to a temperature of 300° C. to 500° C.

7. The process of claim 6, wherein the aromatic polyamine comprises 70 to 99.9 mol. % of an aromatic diamine having one or two benzene rings, 0 to 29.9 mol. % of an aromatic triamine or tetramine, and 0.1 to 10 mol. % of diaminosiloxane.

8. The process of claim 6, wherein 25 to 50 mol. % of the aromatic tetracarboxylic acid is converted into a mono- or di-lower primary alcohol ester thereof.

9. The process of claim 6, wherein the step of heating is performed by foaming the solid of polyimide precursor and converting the foamed product into a polyimide foam.

10. The process of claim 9, wherein the solid polyimide is foamed by microwave heating.

11. The process of claim 9, wherein the foamed product is heated at a glass transition temperature or higher to be converted into the polyimide foam.

12. The process of claim 6, wherein the step of mixing an aromatic tetracarboxylic acid with an aromatic polyamine is performed in the presence of an imidizing catalyst.

13. The process of claim 12, wherein the imidizing catalyst is selected from the group consisting of 1,2-dimethylimidazole, benzimidazole, isoquinoline and substituted pyridines.

14. The process of claim 6, wherein the step of mixing an aromatic tetracarboxylic acid with an aromatic polyamine is performed in the presence of an organic solvent.

* * * * *